Feb. 16, 1954  A. L. RICHE  2,669,686
SAFETY CONTROL FOR MOTOR OPERATED MACHINES
Filed Oct. 23, 1947  2 Sheets-Sheet 1

INVENTOR.
Arthur L. Riche
BY
McCanna and Morsbach
ATTYS.

Feb. 16, 1954 — A. L. RICHE — 2,669,686
SAFETY CONTROL FOR MOTOR OPERATED MACHINES
Filed Oct. 23, 1947 — 2 Sheets-Sheet 2
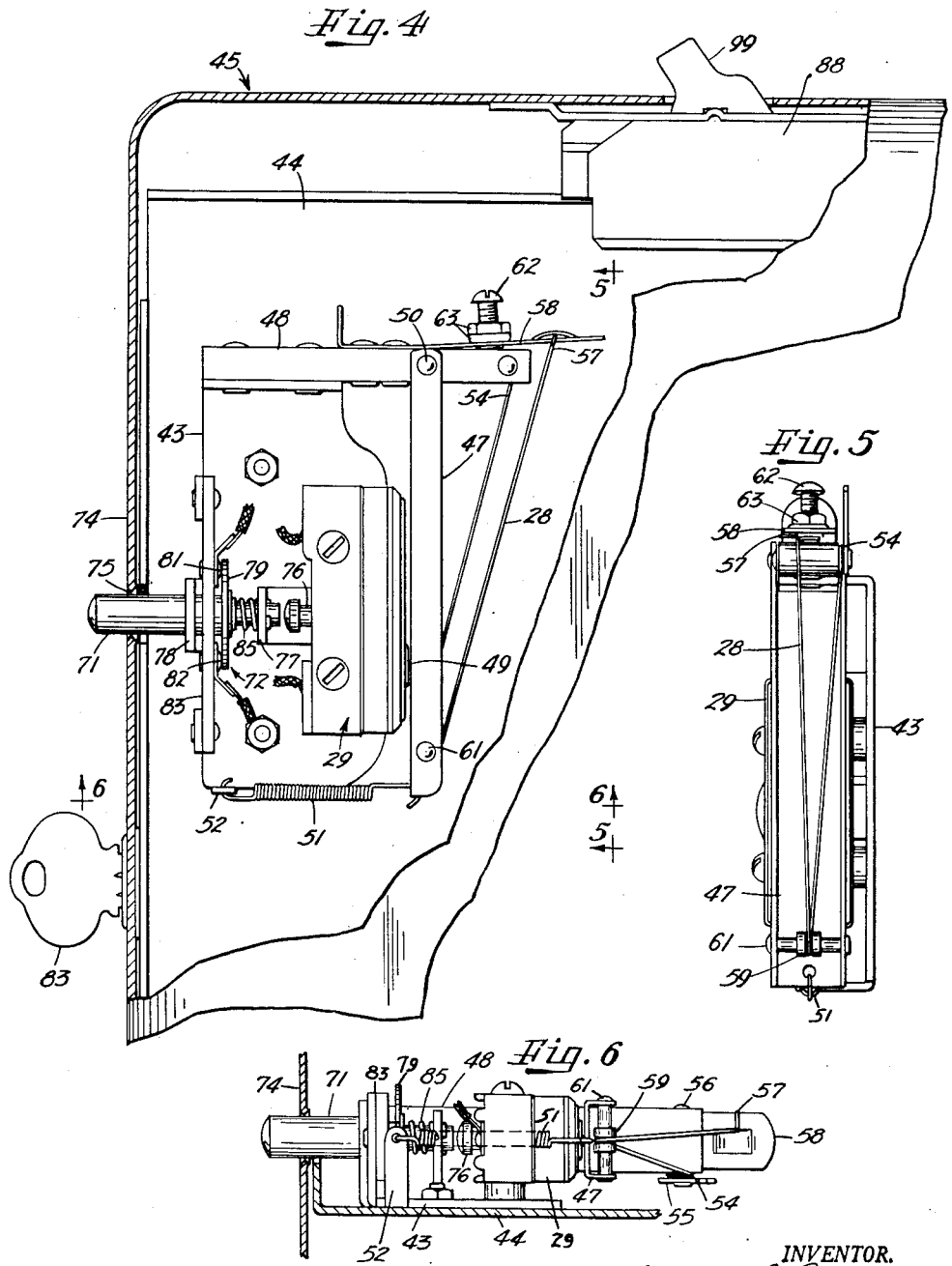

Patented Feb. 16, 1954

2,669,686

UNITED STATES PATENT OFFICE 2,669,686

SAFETY CONTROL FOR MOTOR OPERATED MACHINES

Arthur L. Riche, Freeport, Ill., assignor, by mesne assignments, to Minneapolis-Honeywell Regulator Company, Minneapolis, Minn., a corporation of Delaware Application October 23, 1947, Serial No. 781,519

22 Claims. (Cl. 318—471)

This invention relates to a controller and more particularly to a two-handed safety controller for a power driven machine.

Machines having a movable or reciprocating member engaging another member and requiring an operator to feed work pieces between the mating parts are inherently hazardous. With such machines, safety precautions must be taken in order to avoid accidents to operators due to their carelessness or inadvertence. In factories using power driven machines today, the provision of safety devices for such machines is no small problem. Some machines now employ two-handed control systems and others use mechanical guard systems. Neither of these systems has been entirely satisfactory. The present two-handed controllers have been "beaten" and the mechanical guard systems are themselves hazardous and place the operator under a nervous strain.

Because remuneration to an operator is often made on a piece-work basis, operators have become very adept in "beating" safety systems. Thus, for example, in some electrical controllers designed for the use of two hands the operator has found that by tying down one switch, such as by the use of a clamp or by a heavy weight, he can have one free hand with which he can put a work piece in the machine and thereby increase production and his remuneration. The over-all result as far as the factory is concerned is less production because eventually the operator gets careless and operates the machine while his free hand is between the mating members of the power driven machine. Obviously, this operator is lost to the factory. New personnel has to be trained to operate the machine. This is an expense factories desire to avoid and one which is unnecessary. Moreover, the new operator requires operating experience before he can equal the output of the experienced operator.

Accordingly, a primary object of my invention is to provide a controller requiring two-handed operation that is in itself safe, that is positive in its action, that is simple in construction, that cannot be "beaten," and that places the operator under no strain and so reduces the operator's effort as to increase production and remove temptation to even try to "beat" the controller.

Another object of the invention is to provide a controller of the above character having a plurality of manually operated mechanisms requiring concurrent operation within a predetermined period of time with means so that it is impossible to apply power to the controlled machine when only some of the manually operated mechanisms are operated within the period of time.

Yet another object of the invention is to provide a controller of the above character with a power circuit that employs a novel arrangement of a disconnecting device or mechanism, a plunger for reclosing the disconnecting mechanism, and an interlock device associated therewith such that the disconnecting mechanism cannot be held in an operative position or tampered with without such tampering or holding in being apparent.

A still further object of the invention is to provide a controller of the above character for a motor driven machine having an actuator with means wherein the power to the actuator can be selectively controlled in a predetermined relation with the operation of the motor so as to insure that the machine cannot be accidentally operated while the latter is being serviced or repaired.

Another object of the invention is to provide a controller of the above character having a plurality of manually operated switches requiring practically simultaneous concurrent operation with a novel electrical circuit wherein operation of only some of the manually operated switches causes a current unbalance or a potential difference in the controller circuit that is effective in preventing the flow of power to the actuator.

Other objects and advantages of the invention will become apparent from the following detailed description taken in connection with the accompanying drawings, in which—

Fig. 4 is a cut-away view of the controller housing showing the disconnecting switch and the plunger for reclosing the latter;

Fig. 5 is a view taken substantially along the line 5—5 of Fig. 4, and

Fig. 6 is a view taken substantially along the line 6—6 of Fig. 4.

Figure 1:
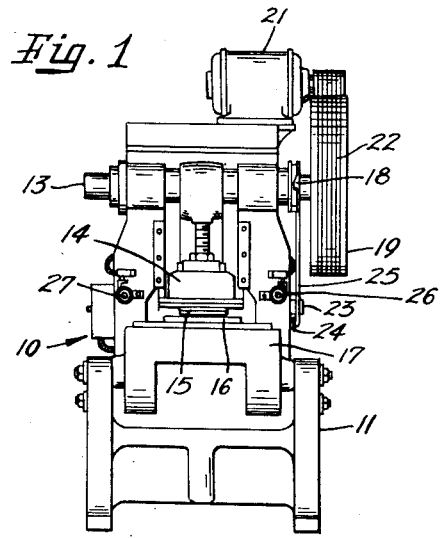
Figure 1 is a front elevational view of a power driven machine utilizing a controller embodying the present invention.

Referring now to the drawings, the invention is shown embodied in a controller for controlling the operation of a power driven machine. It is to be understood that the controller contemplated herein can be utilized in some instances to control the motivating power unit or actuator of the machine directly and in other instances can be utilized to control an auxiliary actuator or device which in turn controls the machine or some phase in the operation of the machine. Also it is to be understood that the principles set forth hereinafter are applicable to all types of power machines whether they are operated by electric power, hydraulic power, pressure fluid power, or the like. For purposes of illustration, the controller is shown connected to an actuator which controls the operation of an electric power driven punch press 10. The latter comprises a base 11 (see Figs. 1 and 2) having a C-frame 12 mounted thereon for supporting a driving shaft 13. Intermediate the ends of the shaft 13 is a ram 14 formed with a suitable punch 15 at one end mounted for reciprocation toward and away from a die 16 supported on a bed 17. The shaft 13 is driven through a conventional clutch 18 by a flywheel 19. The latter is connected to a motor 21, mounted on the C-frame 12 through a V-belt drive 22. The clutch 18 is controlled by the actuator, in this instance in the form of a solenoid 23, actuating a pivotally mounted link 24 and a rod 25 operatively associated with the clutch 18 for controlling the position of the latter.

My invention is concerned with a controller for a power driven machine of the foregoing character that positively requires the use of both hands to operate and is so arranged that if one hand operation is attempted the actuator 23 is disconnected from the power supply, thereby making the machine inoperative. Thus, it contemplates a controller (see Fig. 3) having a pair of manually operated mechanisms 26 and 27 which require concurrent operation for connecting the power to the actuator 23 and timing means 28 operable when only one of said mechanisms is operated within a predetermined period of time for actuating a disconnecting mechanism 29 interconnected with the source of power so that in one position of the disconnecting mechanism it is impossible to connect the actuator 23 to the source of power.

To effect the aforegoing in this embodiment of the invention, I utilize a novel control circuit in the controller such that when one hand operation is attempted, a change of potential occurs in the circuit that is utilized to operate means operative on a predetermined potential difference maintained for a predetermined time to open the power circuit to the actuator 23 thereby making it impossible to operate the machine. In general, the control circuit, diagrammatically illustrated in Fig. 3, comprises an impedance 30 connected in parallel with the actuator 23, an impedance 31 arranged to be connected across a source of power, the manually operated mechanisms 26 and 27 in the form of hand operated switches interposed between the actuator 23 and the source of power, and the timing means 28 herein in the form of a potential responsive means connected between the impedances 30 and 31 such that an unbalance of potential for a predetermined time in the impedances trips the disconnecting mechanism 29 to open the power circuit to the actuator.

Figure 2:
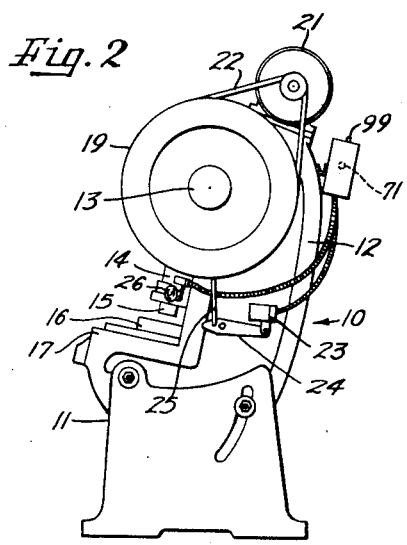
Fig. 2 is a side elevational view of the power driven machine.

As shown, the impedance 30 is in the form of a resistance connected in parallel with the actuator 23, in this instance a solenoid, by conductors 32 and 33. One side of the solenoid 23 and the resistance 30 is connected to the source of power through the manually operated switch 26, conductors 34 and 35, and the opposite side is connected to the power supply through the manually operated switch 27 and connection means designated generally by the numeral 36. The manually operated switches 26 and 27 are of a conventional type located in a convenient position on the machine 10 for ready accessibility by the operator. In Figure 1 the switches are shown as being mounted on opposite sides respectively of the punch press 10 adjacent the ram 14. The impedance 31 is in the form of a balancing coil or autotransformer and is connected across the power supply by conductors 37 and 38.

The potential responsive means 28 in the present embodiment of the invention is in the form of a current responsive thermal element or hot wire connected between a center tap 39 of the balancing coil 31 and a center tap 41 of the resistance 30 so that when a potential difference exists between the center taps a current flows through the potential responsive means. Upon the flow of current therethrough for the predetermined time the potential responsive means 28 trips the disconnecting mechanism 29. It is to be understood that the impedances 30 and 31 could be made up of two series connected impedance arms with the junctions between the arms, being at the same potential when both switches 26 and 27 are closed, and serving the same purpose as taps 39 and 41.

The hot wire 28 herein (see Fig. 4) is mounted on a bracket 43 secured to a panel 44 mounted in a housing 45 and comprises a resistance wire having a relatively high coefficient of expansion, controlling the movement of a lever 47 that trips the disconnecting mechanism 29. The lever is pivotally supported at one end on a rib 48 rigidly affixed to the bracket 43 and engages an actuator pin 49 on the disconnecting mechanism 29. The pivotal support is formed herein by a pin 50 extending through the end of the lever 47 and the rib 48. The resistance wire supports the outer end of the lever 47 and restrains movement of the lever against the action of a spring 51, stretched between the free end of the lever 47 and an ear 52 on the bracket 43 to urge the lever 47 in a direction to actuate the mechanism 29. For this purpose one end 54 (see Fig. 6) of the resistance wire is connected to a terminal 55 supported at the outer end of the rib 48 as by a rivet 56. The opposite end 57 of the resistance wire is spaced from the end 54 and is affixed to an elongated bar 58 rigidly mounted at one end to the rib 48 and having the end connected to the resistance wire 28 free to overlie the outer end of the rib 48. Intermediate its spaced, fixed ends 54 and 57 the wire is looped around an insulator 59 on a pin 61 supported at the outer end of the lever 47. Both fixed ends of the resistance wire are spaced from the pivotal mounting of the lever 47 so that in the normal position of the wire the forces set up thereby restrain the lever 47 from tripping the disconnecting mechanism 29. For purposes of adjusting the position of the lever 47 relative to the actuator pin 49, an adjustable screw 62 with suitable locknuts 63 is threaded through the bar 58 so as to engage the rib 48. By adjusting the screw the location of the end 57 of the resistance wire can be varied so that the position of the outer end of the lever 47 relative to the actuator pin 49 can in turn be adjusted. Current flowing through the resistance wire causes the latter to expand. Since the spring 51 urges the lever 47 to swing about the pin 50, it is to be understood that upon sufficient expansion of the resistance wire the lever 47 will trip the disconnecting mechanism 29. In this instance the disconnecting mechanism 29 is in the form of a two-position switch having terminals 65 and 66 (see Fig. 3) connected to conductors 67 and 68, respectively, forming a part of the connection means 36 between the source of power and the actuator 23. In its normal position the switch 29 closes the circuit between the actuator 23 and the power source and in the other position the switch opens the circuit between the source of power and the actuator 23.

Means is provided for adjusting the predetermined period of time within which the manually operated mechanisms 26 and 27 must be operated. For this purpose an adjustable resistance 69 is connected in series with the hot wire 28. By increasing the resistance in the hot wire circuit the flow of current through the hot wire will be decreased. Thus, the current must flow for a longer period of time for the hot wire to trip the disconnecting switch 29. Similarly, when the resistance is decreased the current is increased and the hot wire operates in a shorter period of time.

One aspect of my invention is concerned with effecting a physical arrangement of the disconnecting mechanism 29 such that it is impossible to lock the latter in a closed position or otherwise tamper with the mechanism 29 without such tampering being evident to a supervisor or other responsible person. Thus it contemplates encasing the disconnecting mechanism in the housing 45 (see Fig. 4), the interior of which is inaccessible to the operator of the machine and arranging a plunger 71 operable from the exterior of the housing that is provided with an interlock device 72, such that when the plunger 71 is depressed to close the disconnecting mechanism 29 the power is prevented from flowing to the actuator 23.

The disconnecting mechanism, in the form of switch 29, as shown in Fig. 4 is mounted on the bracket 43 between the lever 47 and one side 74 of the housing 45. The plunger or push button 71 is in the form of an elongated rod projecting through an opening 75 in the housing 45 and is arranged to engage a pin 76 on the disconnecting switch 29 for reclosing the latter and positioned on the side thereof away from the actuator pin 49. To this end the push button is supported by spaced angle brackets 77 and 78 rigid with the bracket 43 and spaced laterally of the disconnecting switch 29. The brackets 77 and 78 also serve to guide the push button 71 into engagement with the pin 76.

The interlock 72 herein comprises a switch having a movable contact or shorting bar 79 in the form of a collar mounted on the push button 71 for engaging stationary contacts 81 and 82 mounted on an insulating member 83 through which the push button projects. The insulating member 83 is supported by the bracket 43 and is disposed intermediate the brackets 77 and 78. The contacts 81 and 82 are connected to conductors 84 and 67, respectively (see Fig. 3) forming a part of the connection means 36. The collar 79 is loosely retained on the push button 71 and when the latter is shifted bodily axially to engage the pin 76 in reclosing the switch 29, the shorting bar moves out of engagement with the stationary contacts 81 and 82 so as to open the circuit between the external source of power and the solenoid 23. The shorting bar 79 is normally held in engagement with the stationary contacts 81 and 82 by a spring 85 interposed between the bracket 77 and the collar 79. It is impossible to "beat the system" by tying down the push button 71 since the power circuit is interrupted between the contacts 81 and 82. Access to the housing 45 for maintenance purposes may be made through a suitable door or the like at the side 74 and normally secured in a locked position and requiring the use of a key 83 to open. If an attempt is made to jump the contacts 81 and 82 or the disconnecting mechanism 29 such as by first damaging or destroying the housing so that the respective contacts 81 and 82 and the disconnecting mechanism 29 are accessible, this would be obvious to the supervisor or other responsible person because of the damaged condition of the housing 45.

In order to prevent an unexpected and dangerous operation of the machine when the motor 21 is energized as a result of a previous operation of the actuator 23, provision is made for disconnecting the actuator when the motor is denergized. However, when the die 16 is being set up and occasionally during the operation of the press, it is necessary to adjust the die 16 and the stroke of the ram 14. In making these adjustments it is necessary to be able to move the ram 14 to various positions throughout its stroke. This cannot be accomplished while the motor 21 is running, because the punch press 10 makes a complete cycle when the clutch 18 is tripped. Accordingly, one phase of my invention is directed to the provision of means whereby it is possible to operate the actuator 23 when the motivating power unit 21 is idle yet when the motivating power unit is restarted the actuator is disconnected from the power source and requires manual operation of means to reconnect the actuator 23 with the power source. This means comprises in this instance a relay 87 in series with the actuator 23 and operable upon energization and de-energization of the motive power driving the press 10 and a manually operable switch 88 connected in series with the relay 87 and arranged to be selectively operated in a predetermined relation with the relay 87 to complete the circuit to the actuator irrespective of the operation of the power unit 21.

Figure 3:
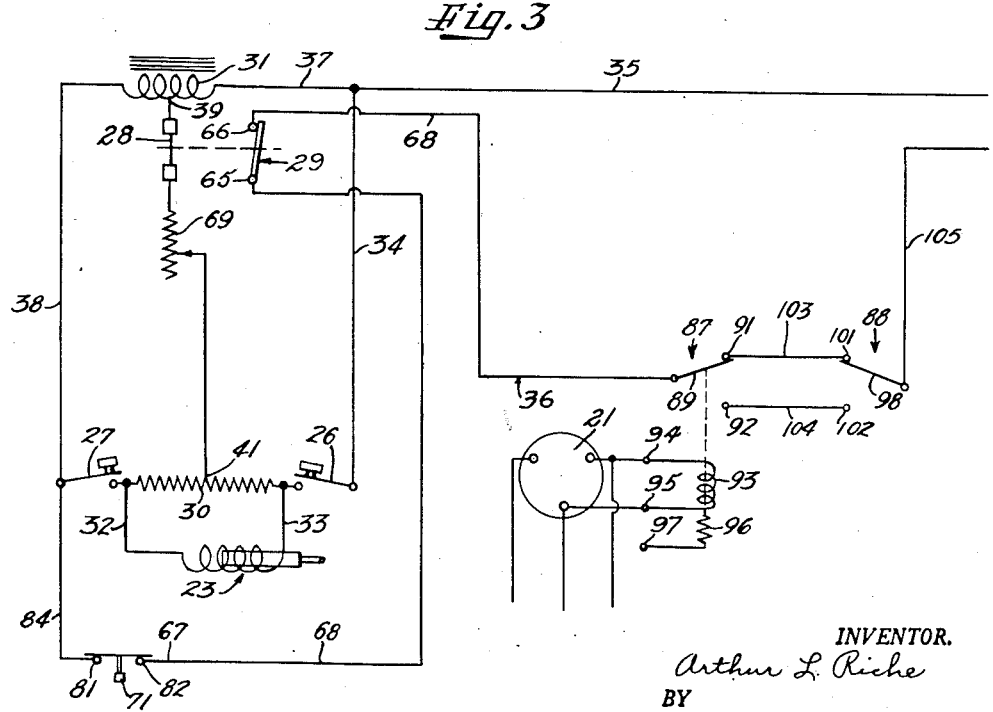
Fig. 3 is an electrical circuit diagram of the controller.

As best shown in Fig. 3 the relay 87 comprises a switch blade 89 connected in series with the conductor 68 forming a part of the connection means 36 and movable between contacts 91 and 92 and a coil 93 for controlling movement of the blade 89. The coil 93 is connected between terminals 94 and 95 of one phase of the driving motor 21, the terminals 94 and 95 only being shown. Where the relay is desired for operation at different voltages, a resistance 96 may be connected in series with the coil 93. In the latter case the coil and the resistance are connected across the motor terminals 94 and 97, respectively. With the motor 21 running, the coil 93 is energized thereby moving the switch blade 89 to engage one of its contacts. When the motor is de-energized the switch blade 89 is moved to engage the other contact.

The manually operable toggle switch 88 comprises a switch blade 98 movable by a handle 99 (see Fig. 4) between contacts 101 and 102, respectively. The contact 101 is electrically connected to the contact 91 (see Fig. 3) by a conductor 103, and the contact 102 is electrically connected to the contact 92 by a conductor 104. The switch blade 98 is connected to a conductor 105, forming a part of the connection means 36.

For purposes of describing the operation of the foregoing relay 87 and switch 88, it will be assumed that when the motor 21 is energized, the relay coil 93 moves the switch blade 89 into engagement with the contact 92. To complete the circuit between the actuator 23 and the source of power the switch blade 98 of the switch 88 is manually moved to engage the contact 102. When the motor 21 is stopped the coil 93 is de-energized and the switch blade 89 of relay 87 moves into engagement with contact 91. Thus with the motor 21 idle the actuator circuit is de-energized. To energize the actuator circuit when the motor 21 is idle the switch blade 98 of the manually operated switch 88 is moved so that it engages contact 101. This closes the circuit between the source of power and the actuator 23 and thereby permits actuation of the clutch 18. It is readily apparent that if the motor 21 is restarted the actuator circuit is opened because energization of the motor 21 energizes the coil 93 which in turn moves the switch blade 89 out of engagement with contact 91 and into engagement with contact 92, thereby opening the circuit to the actuator. Thus, after the motor 21 is restarted it is necessary to manually operate the switch 88 to close the actuator circuit as has been previously described.

The operation of the controller is readily apparent from the foregoing but may be summarized as follows:

Assume that the controller shown in Fig. 3 is connected between the source of power and the solenoid 23. With both switches 26 and 27 inoperative the autotransformer 31 alone is connected across the power source. The impedance of this autotransformer is such that very little current is drawn. Normal operation of the controller requires that both manually operated switches 26 and 27 be concurrently operated within the predetermined time setting of the controller. With both switches closed the source of power is connected to the autotransformer 31, the resistance 30, and the solenoid 23 which are all connected in parallel. The resistance of the resistance 30 and the impedance of the autotransformer 31 are relatively high so that in the normal condition of the controller practically all the current flows through the solenoid 23 so that the latter can be utilized to control the actuation of the power driven machine.

When the manually operated switches 26 and 27 are not actuated together, a difference of potential exists between the midtap points 39 and 41, causing a current to flow through the hot wire 28. Assume that only switch 26 has been actuated. This closes a transformer secondary circuit consisting of the conductor 37, the conductor 34, the switch 26, a part of the impedance 30, the resistance 69, the hot wire 28 and a part of the autotransformer 31. The combined resistance of the other part of the resistance 30 and the actuator 23 is such that practically all current flows through the first part of the resistance 30 under the conditions set forth above. The resistance 69 is adjusted so that with this current flowing for a predetermined time the hot wire 28 operates the disconnecting switch 29 to open the power circuit to the actuator 23. Due to the symmetry of the controller circuit, it is readily apparent that if the switch 27 were operated a sufficient time ahead of the switch 26 the disconnecting switch 29 would be operated in a similar manner to open the circuit to the actuator.

I claim:

1. In combination, an electric actuator, connection means for connecting said actuator across a source of power, a resistance connected in parallel with said actuator, a coil, means for connecting said coil across said source of power, a disconnecting switch in series with said connection means operable to open the circuit from said power source to said actuator, manual switches connected respectively between each side of said actuator and said connection means, and current responsive means controlling the operation of said disconnecting switch and connected between intermediate points on said coil and said resistance which are at substantially equal potentials when said coil and said resistance are connected across said source of power, said manual switches when closed concurrently connecting said actuator across said source of power for establishing substantially equal potentials at said intermediate points on said coil and said resistance, said current responsive means opening said disconnecting switch in response to a current through said current responsive means resulting from the potential difference between said intermediate points on said coil and said resistance upon closing of only one of said manual switches while said coil is connected across said source of power.

2. In combination, an electric actuator, connection means for connecting said actuator across a source of power, a first impedance connected in parallel with said actuator and having a midtap, switch means connected between each side of said actuator and said connection means, and a second impedance having a midtap thereon, means for connecting said second impedance across said source of power, current responsive means connected between said midtaps of said first and second impedances, and an interrupting switch in said connection means for connecting said actuator across said source of power operable by said current responsive means to disconnect said actuator from said source of power in response to a predetermined current through said current responsive means, said switch means when closed concurrently connecting said actuator across said source of power and establishing equal potentials at said midtaps on said first and second impedances, said current responsive means opening said disconnecting switch in response to said predetermined current through said current responsive means resulting from the potential difference between said midtaps on said first and second impedances upon closing of only one of said switch means while said second impedance is connected across said source of power.

3. In a controller for a power driven machine, the combination of an electrical device controlling an operation of the machine, a first impedance connected in parallel with said device, means for connecting said first impedance and said device across a source of power, a second impedance, means for connecting said second impedance across said source of power, current responsive means connected between intermediate points on said first and second impedances which are at substantially equal potentials when said first and second impedances are connected across said source of power, means responsive to a predetermined current flowing through said current responsive means for a predetermined time for opening the power circuit to said device, resistance means connected to said current responsive means for varying the predetermined time of said latter means, and manually operable switches connected respectively between each side of said device and said source of power and operative when closed substantially simultaneously to connect said device across said source of power and to establish substantially equal potentials at said intermediate points on said first and second impedances, said power circuit opening means being operative to open the power circuit to said device in response to a predetermined current through said current responsive means resulting from the potential difference between said intermediate points on said first and second impedances upon closing of only one of said manually operable switches while said second impedance is connected across said source of power.

4. In a control circuit, the combination of a solenoid for controlling the operation of a machine, a pair of conductors for connecting the solenoid across a source of power, switches interposed respectively between said solenoid and each conductor, a resistance in parallel with said solenoid, an impedance, means for connecting said impedance across said source of power, and means, including current responsive means connected between intermediate points on said impedance and said resistance which are at substantially equal potentials when said impedance and said resistance are connected across said source of power, for interrupting the connection of said solenoid across said source of power, said switches connecting said solenoid across said source of power when closed concurrently and establishing substantially equal potentials at said intermediate points on said impedance and said resistance, said interrupting means being operative to interrupt the connection of said solenoid across said source of power in response to current through said current responsive means resulting from the potential difference between said intermediate points on said impedance and said resistance when only one of said switches is closed while said impedance is connected across said source of power.

5. In combination, an actuator, an impedance arranged to be connected in parallel with said actuator, connection means for connecting said actuator to a source of power, switch means connected between each side of said actuator and said connection means and arranged so that substantially concurrent operation of said switch means is required to energize said actuator, a second impedance between said connection means, and current responsive means connected between said first and second impedances for interrupting the circuit to said actuator, said latter means being operative upon closing of only one of said switches for a predetermined time to disconnect said actuator from said source of power.

6. A controller for a power driven machine having an electric motor for supplying the motive power thereto and an actuator for controlling the application of motive power comprising, a control circuit for controlling the operation of said actuator, a first switch in series with said circuit comprising a switch element movable between opposed contacts, means responsive to the energization of said motor for controlling the position of said switch so that upon energization of said motor said switch element engages one contact and upon de-energization of said motor said switch element engages the opposite contact, and a manually operable switch connected in series with said control circuit comprising a second switch element movable between opposed contacts, each of said latter contacts being electrically connected with a corresponding contact on the first switch, said manually operated switch arranged with said first switch so that selective operation thereof is required to energize the control circuit.

7. In a safety controller for a power operated machine, the combination of an actuator for operating the machine, connection means for connecting said actuator across a source of power, a first pair of series connected impedance arms connected in parallel with said actuator, a second pair of series connected impedance arms, means for connecting said second pair of series connected impedance arms across said source of power, the junctions of said series connected impedance arms of each pair being at substantially equal potentials when said actuator and said second pair of series connected impedance arms are connected across said source of power, means, including current responsive means connected between the junctions of said series connected impedance arms of each pair, operative in response to a predetermined difference in potential between said junctions to prevent the flow of power to said circuit, and switch means connected between each side of said connection means and said actuator, said switch means connecting said actuator across said source of power when closed concurrently and establishing substantial equal potentials at said junctions of said series connected impedance arms of each pair, said power flow preventing means preventing the flow of power to said actuator from said source of power in response to a current through said current responsive means resulting from the potential difference between said junctions of the respective series connected impedance arms of each pair upon closing of only one of said switch means while said second pair of series connected impedance arms is connected across said source of power.

8. In a safety controller for a power operated machine, the combination of an actuator for said machine, means for connecting said actuator to a source of power, a pair of manually operated mechanisms controlling the connections of said actuator to said source of power, a disconnecting device disposed in said means for connecting the actuator to the source of power and operable when opened to disconnect the actuator from the source of power, timing means operable upon operation of only one of said mechanisms for opening said disconnecting device to disconnect the actuator from the source of power, means for reclosing said disconnecting device, and auxiliary disconnecting means located in said means for connecting the actuator to the source of power and operable by said reclosing means to disconnect said actuator from said source of power when said disconnecting device is being reclosed.

9. A controller for a power driven machine having a motor for supplying the motive power thereto and an actuator for controlling the application of said motive power, comprising, control means for applying power to said actuator, means responsive to the operating condition of said motor for disconnecting the actuator from the source of power and selective means interconnected with said latter means for manually controlling the connection of power to said actuator irrespective of the operating condition of the motor.

10. In combination, an actuator, conductors for connecting said actuator across a source of power, a first impedance connected in parallel with said actuator, a second impedance, means for connecting said second impedance across said source of power, a disconnecting switch connected in series with said conductors and operable when opened to prevent flow of power to said actuator, current responsive means connected between intermediate points on said first and second impedances which are at substantially the same potential when said actuator and said second impedance are connected across said source of power, said current responsive means being operable upon flow of a predetermined current therethrough resulting from a potential difference between said points to open said disconnecting switch, a shorting switch connected in series with said conductors, a plunger for resetting said disconnecting switch and simultaneously opening said shorting switch so that while the plunger is depressed to reclose the disconnecting switch the plunger opens said shorting switch to disconnect the actuator from the source of power, a housing completely enclosing said first and second impedances, said disconnecting switch, said current responsive means and said shorting switch, and having an opening for said plunger whereby the latter only is accessible from the exterior of the housing, and manually operable switches disposed between said actuator and said conductors for connecting said actuator across said source of power when closed concurrently to establish substantially the same potential at said points on said first and second impedances, said current responsive means being operative in response to the current through it resulting from the potential difference between said points on said first and second impedances upon closing of only one of said manually operated switches while said second impedance is connected across said source of power to open said disconnecting switch to thereby disconnect said actuator from said source of power.

11. The combination recited in claim 10 with means associated with the housing for preventing unauthorized access thereto by an operator of the machine.

12. A controller for operating a controlled circuit from a controlling circuit, comprising a pair of contacts connected in series in said controlled circuit, a disconnecting switch connected in series in said controlled circuit, current responsive means in said controlling circuit operable to open said disconnecting switch upon a flow of a predetermined current through said controlling circuit for a predetermined interval, a plunger for closing said disconnecting switch having a shorting bar thereon engageable with said contacts whereby axial movement of said plunger closes said disconnecting switch and disengages said shorting bar from engagement with said contacts to open said controlled circuit and release of said plunger effects engagement of said shorting bar with said contacts to close said controlled circuit and a housing for completely encasing said pair of contacts, said disconnecting switch, said current responsive means and said shorting bar to prevent unauthorized access to the above described components and having an opening for said plunger whereby the latter only is accessible from the exterior of the housing.

13. In a controller for operating a controlled circuit from a controlling circuit, comprising a pair of spaced contacts connected in series in said controlled circuit, a thermal element connected in said controlling circuit, a disconnecting switch connected in series with said contacts to open said circuit upon the flow of a predetermined current in said thermal element, a plunger adjacent said switch for reclosing the latter and having a shorting bar thereon engageable with said contacts whereby axial movement of said plunger in reclosing said switch disengages said shorting bar from engagement with the contacts and release of said plunger effects engagement of said shorting bar with said contacts, a housing for enclosing said pair of contacts, said disconnecting switch, said thermal element and said shorting bar having an opening for said plunger whereby the latter only is accessible from the exterior of the housing and means associated with the housing for preventing unauthorized access to the components therein by an operator.

14. In a controller for operating a controlled circuit from a controlling circuit, the combination of a pair of contacts connected in series in said controlled circuit, a disconnecting switch connected in series in said controlled crcuit, a current responsive means in said controlling circuit operable to open said disconnecting switch upon a flow of a predetermined current through said controlling circuit for a predetermined interval, and a plunger for closing said disconnecting switch having a shorting bar thereon engageable with said contacts whereby axial movement of said plunger closes said disconnecting switch and disengages said shorting bar from engagement with said contacts to open said controlled circuit and release of said plunger effects engagement of said shorting bar with said contacts to close said controlled circuit.

15. In a controller for operating a controlled circuit from a controlling circuit, the combination of a disconnecting switch connected in series in said controlled circuit, a hot wire in said controlling circuit operable to open said disconnecting switch to interrupt the flow of power to said controlled circuit upon a predetermined flow of current through said hot wire for a predetermined interval, a pair of contacts connected in series with said disconnecting switch in said controlled circuit, and a plunger for re-closing the disconnecting switch having a shorting bar thereon engageable with said contacts whereby axial movement of said plunger in re-closing said switch disengages said shorting bar from engagement with said contacts to open said controlled circuit and release of said plunger effects engagement of said shorting bar with said contacts to close said controlled circuit.

16. In a controller for operating a controlled circuit from a controlling circuit, the combination of a pair of spaced contacts connected in series in said controlled circuit, a disconnecting switch connected in series in said controlled circuit, a current responsive thermal element in said controlling circuit operable to open said disconnecting switch to open said controlled circuit upon a flow of a predetermined current in said thermal element, and a plunger adjacent said switch for reclosing the latter and having a shorting bar thereon engageable with said contacts whereby axial movement of said plunger in reclosing said switch disengages said shorting bar from engagement with the contacts to open said controlled circuit and release of said plunger effects engagement of said shorting bar with said contacts to close said controlled circuit.

17. In combination, an electric device, connection means for connecting said device to a source of power, a first impedance connected in parallel with said device, a second impedance connected to said source of power in parallel with said connection means, a disconnecting switch connected in series with said connection means and operable to interrupt the flow of power to said device, contacts connected in series with said connection means, a plunger for reclosing said disconnecting switch having a shorting bar thereon for engaging said contacts, said plunger arranged so that when said plunger is depressed to reclose said disconnecting switch said bar disengages said contacts to disconnect said device from said source of power, current responsive means connected between intermediate points on said first and second impedances which are at substantially the same potential when said device and said second impedance are connected to said source of power, said current responsive means being operable upon a predetermined current therethrough resulting from a potential difference between said points to actuate said disconnecting switch to disconnect said device from said source of power, manually operable switches connected between each side of said device and said connection means for connecting said device to said source of power when closed substantially simultaneously to establish substantially equal potentials at said points on said first and second impedances, said current responsive means being operative in response to the current through it resulting from the potential difference between said intermediate points on said first and second impedances upon closing of only one of said manually operable switches while said second impedance is connected to said source of power to open said disconnecting switch to disconnect said device from said source of power.

18. In combination, an actuator for a machine, means for connecting said actuator to a source of power, a resistance in parallel with said actuator, an autotransformer connected to said source of power across said connecting means, disconnecting means, including a thermal current responsive element connected between intermediate points on said autotransformer and said resistance which are at substantially equal potentials when said autotransformer and said resistance are connected to said source of power, operable upon a predetermined current through said thermal current responsive element to disconnect said actuator from said source of power, manually operable switches connected between said actuator and each connection with said means for connecting said actuator to said source of power when closed substantially simultaneously to establish substantially equal potentials at said intermediate points on said autotransformer and said resistance, said disconnecting means being operative to disconnect said actuator from said source of power in response to a predetermined current through said thermal current responsive element resulting from the potential difference between said intermediate points on said autotransformer and said resistance upon closing of only one of said manually operable switches while said autotransformer is connected to said source of power.

19. In combination, an electric device, a pair of conductors for connecting said device across a source of power, a resistance, means for connecting said resistance in parallel with said device, a pair of switches connected respectively between each conductor and said device, an autotransformer, means for connecting said autotransformer across said source of power, a hot wire element connected between intermediate points on said resistance and autotransformer which are at substantially the same potential when said autotransformer and said resistance are connected across said source of power, and means responsive to a current through said hot wire element resulting from a potential difference between said points to disconnect said device from said source of power, said pair of switches connecting said device across said source of power when closed simultaneously to establish substantially equal potentials at said intermediate points on said autotransformer and said resistance, said last-mentioned means disconnecting said device from said source of power in response to a current through said hot wire element resulting from the potential difference between said intermediate points on said autotransformer and said resistance when only one switch of said pair of switches is closed while said autotransformer is connected across said source of power.

20. In a controller for a power machine, the combination of an electrical device for controlling an operation of the machine, a resistance connected in parallel with said device and having a mid-tap, means for connecting said device across a source of power, a coil having a mid-tap, means for connecting said coil across said source of power, the mid-taps on said coil and said resistance being at substantially the same potential when said coil and said device are both connected across said source of power, means, including means connected between the mid-taps on said resistance and said coil responsive to a predetermined current flowing therebetween for a predetermined time, for interrupting the flow of power to said device, adjustable resistance means in series with said current responsive means, means for varying the predetermined time setting thereof, and manually operable switches connected respectively between each side of said device and said source of power, said manually operable switches connecting said device across said source of power when both switches are closed within said predetermined time to establish substantially equal potentials at said mid-taps on said coil and said resistance, said interrupting means being operative to interrupt the flow of power to said device in response to said predetermined current through said current responsive means resulting from the potential difference between said mid-taps when one of said manually operable switches is closed and the other manually operable switch remains open for said predetermined time when said coil is connected across said source of power.

21. A controller for a power driven machine having a motor for supplying power and an actuator for controlling an application of power thereto comprising a control circuit for controlling the operation of said actuator, a manually operated switch in series with said circuit comprising a switch element movable between opposed contacts, a second switch in series with said circuit comprising a second switch element movable between opposed contacts, each of said latter contacts being electrically connected with one of said contacts on said manually operated switch, means responsive to the energization and de-energization of said motor for controlling the position of said second switch element so that upon energization of said motor said second switch element engages one contact and upon de-energization of said motor said second switch element engages the opposite contact, said first switch element being movable manually between its contacts to engage the contact corresponding to the contact engaged by said second switch element to energize said actuator.

22. In combination, an electrical device, connection means for connecting said electrical device across a source of power, a first impedance connected in parallel with said electrical device, switch means between each side of said electrical device and said connection means, a second impedance, means for connecting said second impedance across said source of power, current responsive means connected between intermediate points on said first and second impedances which are at substantially equal potentials when said first and second impedances are connected across said source of power, and an interrupting switch in said connection means for connecting said electrical device across said source of power operable by said current responsive means in response to a predetermined current through said current responsive means, said switch means when closed concurrently connecting said electrical device across said source of power and establishing substantially equal potentials at said intermediate points on said first and second impedances, said current responsive means opening said interrupting switch in response to said predetermined current through said current responsive means resulting from the potential difference between said intermediate points on said first and second impedances upon closing of only one of said switch means while said second impedance is connected across said source of power.

ARTHUR L. RICHE.

References Cited in the file of this patent

UNITED STATES PATENTS

| Number | Name | Date |
|---|---|---|
| 1,634,382 | Oberschmidt | July 5, 1927 |
| 1,775,730 | McNicol | Sept. 16, 1930 |
| 2,151,812 | Taliaferro et al. | Mar. 28, 1939 |
| 2,304,542 | Chambers | Dec. 8, 1942 |
| 2,404,980 | Munschauer, Jr. | July 30, 1946 |
| 2,579,595 | McLane | Dec. 25, 1951 |